(No Model.)

A. B. SHAW.
BICYCLE TIRE.

No. 551,408.                     Patented Dec. 17, 1895.

UNITED STATES PATENT OFFICE.

AI B. SHAW, OF MEDFORD, MASSACHUSETTS, ASSIGNOR TO THE SELF-SEALING BICYCLE TIRE COMPANY, OF PORTLAND, MAINE.

BICYCLE-TIRE.

SPECIFICATION forming part of Letters Patent No. 551,408, dated December 17, 1895.

Application filed January 6, 1894. Serial No. 495,947. (No model.)

*To all whom it may concern:*

Be it known that I, AI B. SHAW, of Medford, in the county of Middlesex, State of Massachusetts, have invented certain new and useful Improvements in Bicycle-Tires, of which the following is a description sufficiently full, clear, and exact to enable any person skilled in the art or science to which said invention appertains to make and use the same, reference being had to the accompanying drawings, forming part of this specification, in which—

Figure 1:
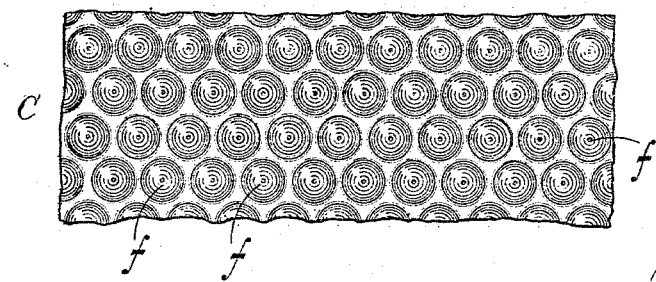
Figure 2:
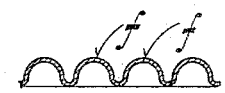
Figure 3:
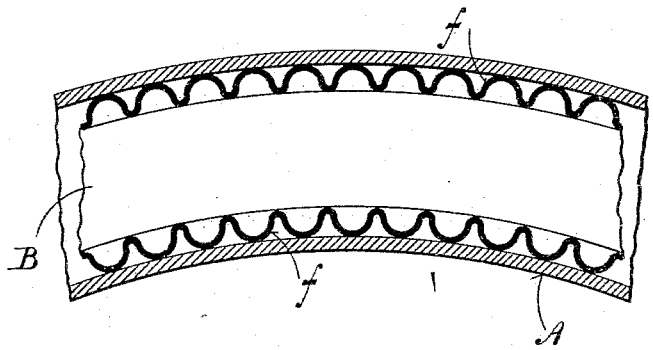

Figure 1 is a plan view of a portion of the elastic sheet from which the inner tube of my improved tire is constructed; Fig. 2, a sectional view of the same; Fig. 3, a longitudinal section of a portion of the tire before inflation, and Fig. 4 a like view showing the position assumed by the inner tube when inflated.

Like letters of reference indicate corresponding parts in the different figures of the drawings.

My invention relates especially to pneumatic tires for bicycles or similar vehicles, the object being particularly to produce a self-sealing device whereby when the tire is punctured the aperture will immediately close, preventing the escape of air from the inflatible tube; and it consists in certain novel features hereinafter fully set forth and claimed, the object being to produce a simple, cheap, and effective device of this character.

The nature and operation of the improvement will be readily understood by all conversant with such matters from the following explanation.

Figure 4:
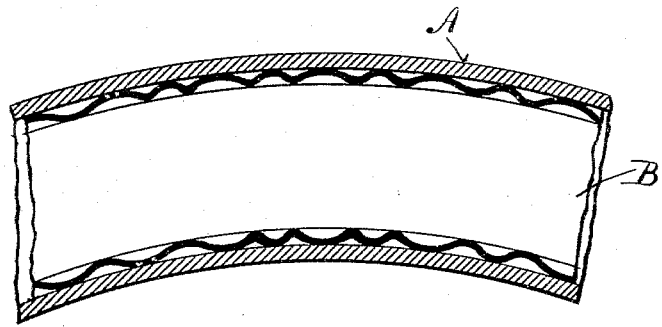

In the drawings, A represents the outer tube or casing of the tire, which is of the ordinary construction, and B the inner or inflatible tube. This inner tube is formed from a sheet of rubber or other suitable elastic material C, (shown in Figs. 1 and 2,) said sheet being "struck up" on one face, forming bosses or projections $f$, arranged a suitable distance apart. The tube B is disposed in the usual manner within the casing and when inflated with an air-pressure which is ordinarily fifty pounds to the inch said projections are flattened or the rubber upset and crowded into substantially a flat sheet, as shown in Fig. 4. The inner tube being confined by the casing, which will not stretch under the air-pressure to any appreciable extent, as soon as a puncture is made through the inner tube and the puncturing obstacle withdrawn, the rubber on the inner tube, tending to regain its normal position, will immediately close the aperture thus made and prevent the escape of air.

Having thus explained my invention, what I claim is—

An air tube for bicycle tires provided integrally with hollow approximately conical projections, substantially as set forth.

AI B. SHAW.

Witnesses:
K. DURFEE,
O. M. SHAW.